United States Patent
Rosenberger et al.

(10) Patent No.: US 6,709,599 B1
(45) Date of Patent: Mar. 23, 2004

(54) WASTE WATER TREATMENT SYSTEM WITH SLIP STREAM

(75) Inventors: Stefan Rosenberger, Moembris (DE); James H Wilson, Columbia, SC (US); Howard Whitehead, Saint Helena Island, SC (US); Randall B. Underwood, Lexington, SC (US); John M Raymount, Jr., Columbia, SC (US)

(73) Assignee: Rwe Nukem Corporation, Columbia, SC (US)

( * ) Notice: Subject to any disclaimer, the term of this patent is extended or adjusted under 35 U.S.C. 154(b) by 66 days.

(21) Appl. No.: 10/111,721

(22) PCT Filed: Oct. 27, 2000

(86) PCT No.: PCT/US00/41663
§ 371 (c)(1),
(2), (4) Date: Apr. 26, 2002

(87) PCT Pub. No.: WO01/44115
PCT Pub. Date: Jun. 21, 2001

Related U.S. Application Data
(60) Provisional application No. 60/161,853, filed on Oct. 27, 1999.

(51) Int. Cl.$^7$ ............................. B01D 61/20; B01D 65/08
(52) U.S. Cl. .................... 210/652; 210/702; 210/805; 210/806; 210/791; 210/196; 210/321.6; 210/321.65; 210/206; 210/97; 210/258; 210/332
(58) Field of Search ...................... 210/639, 665, 210/652, 641, 669, 702, 636, 605, 332, 805, 806, 206, 266, 258, 106, 196, 259, 321.69, 321.6, 195.2, 321.65, 650, 97, 912, 791; 376/313

(56) References Cited

U.S. PATENT DOCUMENTS

| | | | |
|---|---|---|---|
| 4,276,177 A | | 6/1981 | Smith |
| 4,820,426 A | | 4/1989 | Pfertzel et al. |
| 4,983,302 A | | 1/1991 | Balint et al. |
| 5,244,579 A | * | 9/1993 | Horner et al. |
| 5,520,816 A | * | 5/1996 | Kuepper |
| 5,585,531 A | | 12/1996 | Barker et al. |

* cited by examiner

Primary Examiner—Terry K. Cecil
(74) Attorney, Agent, or Firm—Michael A Mann; John B Hardaway, III; Nexsen Pruet Jacobs & Pollard LLC

(57) ABSTRACT

A method and apparatus for processing waste streams wherein a slipstream is formed on the upstream side of an ultrafiltration membrane (120) to carry collected and concentrated filter reject to a microfilter (170) via a slipstream through a conduit (155) at a very low flux through the microfilter. The low flux gives the particles in this stream a chance to interact and thus form an irregular matrix that itself helps to trap particles. The effluent from this matrix and microfilter is returned upstream of the ultrafiltration membrane via a conduit (165) to be repeatedly collected and concentrated. The suspended solids removed from the reject stream and microfilter may then be disposed of directly without further processing. For metal ions, the removal efficiency of ultrafiltration membrane can be improved by injecting sulfide compounds or other compounds upstream of ultrafiltration membrane. Water, a combination of air and water, or a combination of ozone and water can be used to back flush or to clean the ultrafiltration membrane. The water used for back flushing can be the filtrate from the ultrafiltration membrane.

46 Claims, 2 Drawing Sheets

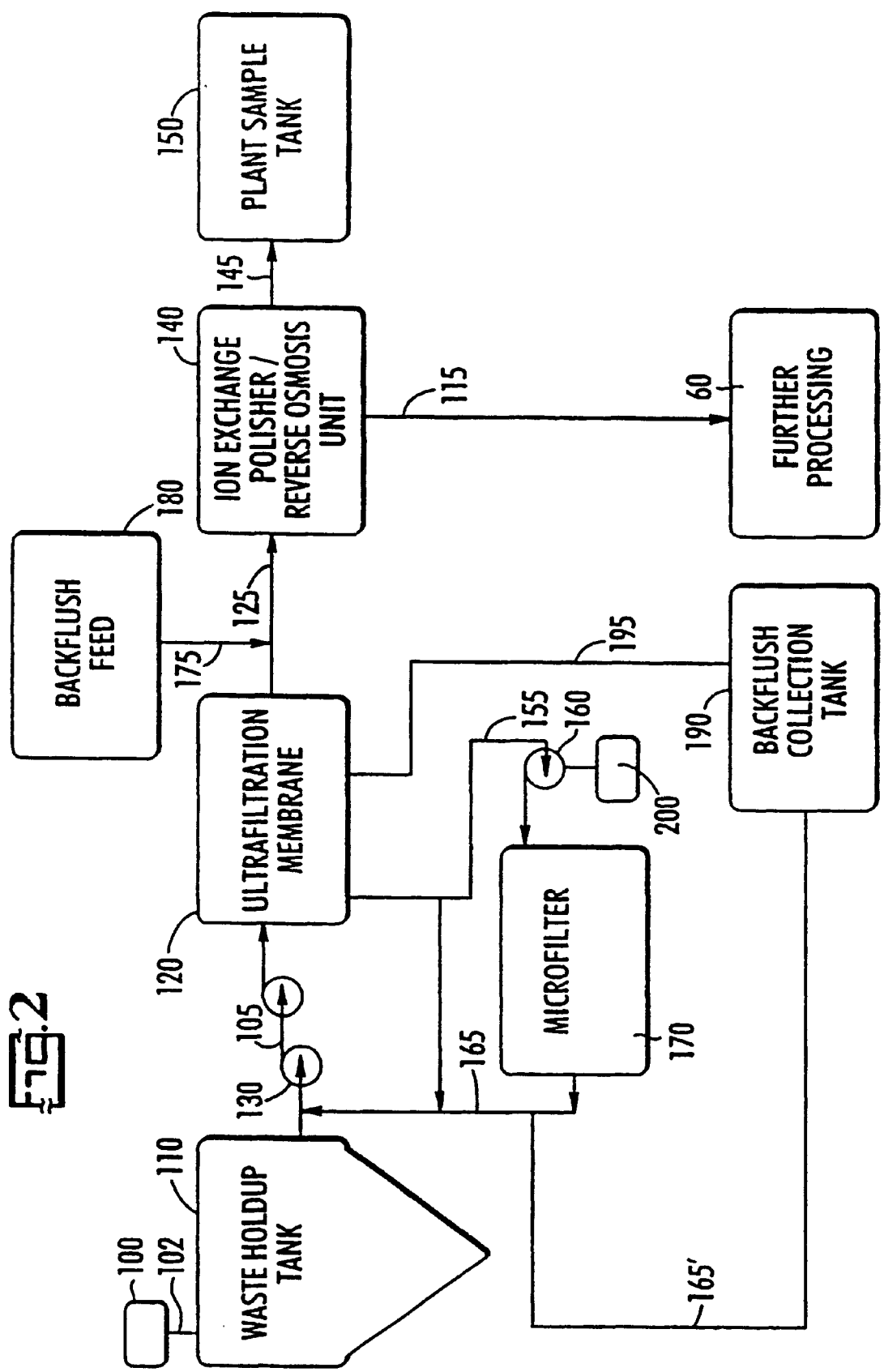

WASTE WATER TREATMENT SYSTEM WITH SLIP STREAM

This application claims the benefit of U.S. Provisional Application No. 60/161,853, filed Oct. 27, 1999.

FIELD OF THE INVENTION

The present invention relates generally to processing of wastes by filtration. In particular, the present invention relates to the processing of radioactive waste streams at nuclear facilities such as nuclear power plants to separate the contaminants from an aqueous effluent.

BACKGROUND OF THE INVENTION

In a nuclear power plant and at other manufacturing and processing facilities where nuclear materials are handled, the waste streams from the facility operations must be processed prior to discharge or reuse in order to remove radioactive contaminants for disposal. These waste streams come from a variety of sources, such as a spent fuel pool, floor drains, and resin tank drains. Because of increasing disposal costs, the separation of the contaminants from the water that carries them has become more and more important. The goal of this separation is to (1) remove sufficient contamination from the aqueous waste stream so that the resulting effluent can be reused or released to the environment and (2) reduce the volume of the waste that must be disposed of.

A number of techniques are used to separate wastes from waste streams, including filtration and ion exchange. Because the wastes may be in the form of particulate of varying sizes and in the form of dissolved ions, these two techniques are commonly used in a particular sequence. Filtration is essentially the removal of particulate from water by passing the water through a porous structure leaving the particles, whose passage is blocked by the structure, behind. Sometimes more than one type of filter is used. By using ever finer filters, including mechanical filters, microfilters, ultra filters, and nano-filters, a very high percentage of particulate can be removed. These various filtration devices are used in a specific sequence; the coarser filters being used first to remove the larger particulate. Then finer filters are used to remove the smaller particulate.

This approach makes good sense. If a fine filter is used first, the amount of particulate it would remove would be so great that the filter, blinded with particulate both fine and coarse, would stop the flow altogether soon after being placed in service. Using filters in sequence from coarse to fine assures that the throughput of each filter is as high as possible. Furthermore, because filters with smaller pore size are generally more expensive, it makes economic sense to use fine filters only for filtering the smallest particles and not also particles that could be filtered with less expensive filters.

From the finest filters used, the waste stream is routed to an ion exchange bed and/or reverse osmosis membranes where dissolved contaminants can be removed. The resulting effluent is nearly free of both particulate and dissolved solids.

Referring to FIG. 1, which illustrates the current practice in a nuclear power plant for handling aqueous waste streams, the aqueous wastes are collected in a waste holdup tank 10. Heavier particulate will settle in the tank, the waste containing suspended particulate is directed through an ultra-filtration membrane 20. Ultrafiltration membrane 20 generally has the capability of ejecting particles of about 0.005 microns or larger at an operating pressure of 3–10 bar. Low molecular weight substances such as sugars and salts pass through it. The effluent from ultrafiltration membrane 20 is next directed through a reverse osmosis membrane 30 or an ion exchange bed 40. Essentially, only water passes through reverse osmosis membrane 30 at its normal operating pressure range of 20–60 bar. The effluent from reverse osmosis membrane 30 or ion exchange bed 40 will be highly purified.

The wastes from each of these steps: the settled particulate from waste tank 10, the rejects from ultrafiltration membrane 20 and reverse osmosis membrane 30 and, eventually, the resins from ion exchange bed 40 will be subjected to further processing 60 to stabilize them for disposal in various ways, including drying and/or solidifying them in a cementitious medium.

The process just described works well. It produces a very clean effluent and the waste itself can be disposed of safely. However, it focuses solely on obtaining a clean effluent. As disposal prices have continued to climb, there has been a growing need to reduce the volume of wastes being disposed of. Thus, there is a need for a way to process wastes that results in less volume and easier handling but does not compromise the quality of the effluent.

SUMMARY OF THE INVENTION

According to its major aspects and briefly recited, the present invention is a method and apparatus for processing aqueous waste streams, especially waste streams from nuclear power plants. The present process reduces the volume of waste to be disposed of compared to the prior art process without affecting the purity of the effluent. It also simplifies handling of the wastes.

In order to achieve this reduction in volume of waste, a portion of the reject from the ultrafiltration step described above is processed in an additional filtration step. The effluent from this additional step is returned upstream of the ultrafiltration membrane and "recycled"; that is, it again repeatedly directed to the ultrafiltration membrane and then through the additional filtration step. The concentrate from this additional step may then be disposed of directly after de-watering.

The additional step includes passing a stream of concentrate collected by the ultrafiltration membrane through a microfilter at a low flux. The velocity through the filter is maintained very low to maximize the solids loading of the microfilter. As solids are collected on the microfilter, the pressure drop will eventually increase. The filter will be replaced when either the maximum allowable pressure drop across it, or, in the case of filtration of radioactive contaminants, the maximum allowable radiation dose is reached.

The microfilter removes substantially all the particulate, including particles smaller than its pore size, because, for all practical purposes, it has a nonzero particle removal efficiency over the range of particle sizes in the waste stream. As long as the particle removal efficiency is greater than zero, the filter will eventually, after repeated passes, remove substantially all particles. By recycling the microfilter effluent to the ultrafiltration membrane, the concentration of the particles in the recycle loop will build up to a level where the rate of particle removal in one pass through the microfilter is equal to the rate of particles being introduced with the feed into the ultrafiltration membrane, establishing an equilibrium.

One contributing factor as to why the microfilter will remove particles smaller than its pore size is due to particle agglomeration; however, agglomeration is just one of the reasons that particles are removed by the microfilter (in fact, agglomeration is not necessary for the microfilter to work as long as other particle removal mechanisms produce a particle removal efficiency that is greater than zero). Agglomeration is a tendency of the particles to form clusters that interlock. The interlocking clusters define narrow, twisting passages through a cake-like matrix that allow water to flow. These passages are irregular, that is, they change direction and cross section, resulting in a filtering action that will trap particulate including particulate that would otherwise pass through the microfilter.

Other forces, such as adsorption, contribute to the removal of small particles. The formation of the cake of particulate against the upstream side of the filtration medium also contributes to the removal of small particles. The cake in effect becomes part of the filter. Cake formation reduces filter pore size and increases the depth of the filter, increasing the likelihood that a small particle will become trapped or adsorbed by the filter. The low flux helps to are that the forces acting on particles from fluid flow do not disrupt the adsorption forces or break up particulate aggregates.

Additionally, the removal efficiency of the Ultrafiltration ("UF") system for radioactive contaminants can be improved by precipitation of radioactive metals dissolved in the waste water. By the addition of sulfides or other chemicals (e.g., other precipitating agents or pH adjusting chemicals) upstream of the ultrafiltration membrane, the metals will be precipitated before they would otherwise pass through this membrane. They, along with other particulate, can be accumulated and concentrated on the microfilter. This precipitation of metals can be so effective that further treatment downstream of the ultrafiltration membrane, as described above, can be eliminated, thus saving all costs associated with that equipment.

The present invention has a number of advantages over other systems. In particular, it is a filtration system for total suspended solids removal that processes a waste stream to produce a effluent (filtrate) stream sufficiently clean for release or re-use and segregating and accumulating the solids into a device, namely, a microfilter, suitable for disposal.

The present system avoids the generation of a reject stream that, in the prior art, requires further processing, such as by drying, solidifying, settling, and centrifuging. Avoiding these processes avoids the corresponding effort, expense, and exposure attendant to them.

The present system allows the effective separation of the collection of wastes from the two primary reject streams, one that primarily contains suspended solids and the other that primarily contains dissolved solids. This separation opens the door for independent and specific treatment of each reject stream. In fact, the treatment that is applied in the present invention results in the elimination of the reject stream that contains suspended solids from an ultrafiltration membrane that in prior art require further processing.

The present system uses the delivery of a portion of the reject from an ultrafiltration membrane by a slip stream to a microfilter, as an integral part of the processing system, notwithstanding the fact that the microfilter has a micron rating larger than the pore size of the ultrafiltration membrane.

The present system, which relies heavily on mechanical filtration through a microfilter, successfully removes substantially all particulate, notwithstanding the fact that the microfilter has a removal efficiency of less than 100% per pass. This success is achieved by repeated recycling of the clarified effluent from the microfilter to the reject side of the ultrafiltration membrane in combination with the low flux across the microfilter.

In the present invention, the use of a low flux slip stream from the reject side of the ultrafiltration membrane maximizes the loading of solids in the microfilter and, consequently, minimizes the frequency of filter change-out and provides numerous other benefits, such as lower dose to personnel and lower material costs.

The present invention also takes advantage of chemical treatment, e.g., pH adjustment or addition of precipitating agents such as sulfur-containing compounds, to the feed to the ultrafiltration membrane in order to precipitate dissolved contaminants and, consequently, to maximize removal of contaminants in feed and make it possible to discharge or reuse the ultrafiltration membrane effluent without the need for further processing steps, such as reverse osmosis or ion exchange.

Because the capacity of the present system can easily be expanded, it can be configured to meet individual plant's wastewater characteristics and existing systems. Furthermore, it can be installed easily in current plants' wastewater treatment systems.

The ultrafiltration membrane can be back flushed to minimize chemical cleaning requirements. Back flushing is performed to remove deposits from the membrane surface in order to recover membrane flux. Back flushing efficiency can be improved by using the reject recirculation pump to produce a high axial velocity through the membrane during back flushing. A gas, such as air or ozone, could be injected either into the backflush liquid or into the recirculating reject stream during membrane back flushing in order to improve back flushing effectiveness by increasing turbulence or by chemically reacting with foulants.

The present invention is being described with frequent reference to radioactive contaminants generated at nuclear power plants. However, it is applicable to all waste water systems where particulate and dissolved materials that can be precipitated must be removed from an aqueous waste stream.

Another important feature of the present invention is the use of a microfilter to receive reject from an ultrafiltration membrane. This feature is counter-intuitive because, in the prior art, waste streams are typically passed through a series of filters beginning with coarser filters and proceeding through finer filters.

A feature of the present invention is the use of a low flux through a microfilter to trap particles, including those smaller in size than the micron rating of the filter. This combination allows greater levels of filtration at cost effective rates than would otherwise be achievable only by using more expensive filters.

Still another feature of the present invention is the use of sulfides or other chemicals to precipitate dissolved metal ions prior to the metal ions reaching the ultrafiltration membrane so that the metal ions can be removed along with particulate. The resulting water passing through the ultrafiltration membrane may well be pure enough to meet release criteria.

Other features and their advantages will be apparent to those skilled in the art of filtration from a careful reading of the Detailed Description of Preferred Embodiments accompanied by the following Drawings.

BRIEF DESCRIPTION OF THE DRAWING

In the figures,

FIG. 2 is a schematic drawing of a process for treating an aqueous waste stream according to a preferred embodiment of the present invention.

DETAILED DESCRIPTION OF PREFERRED EMBODIMENTS

Figure 1:
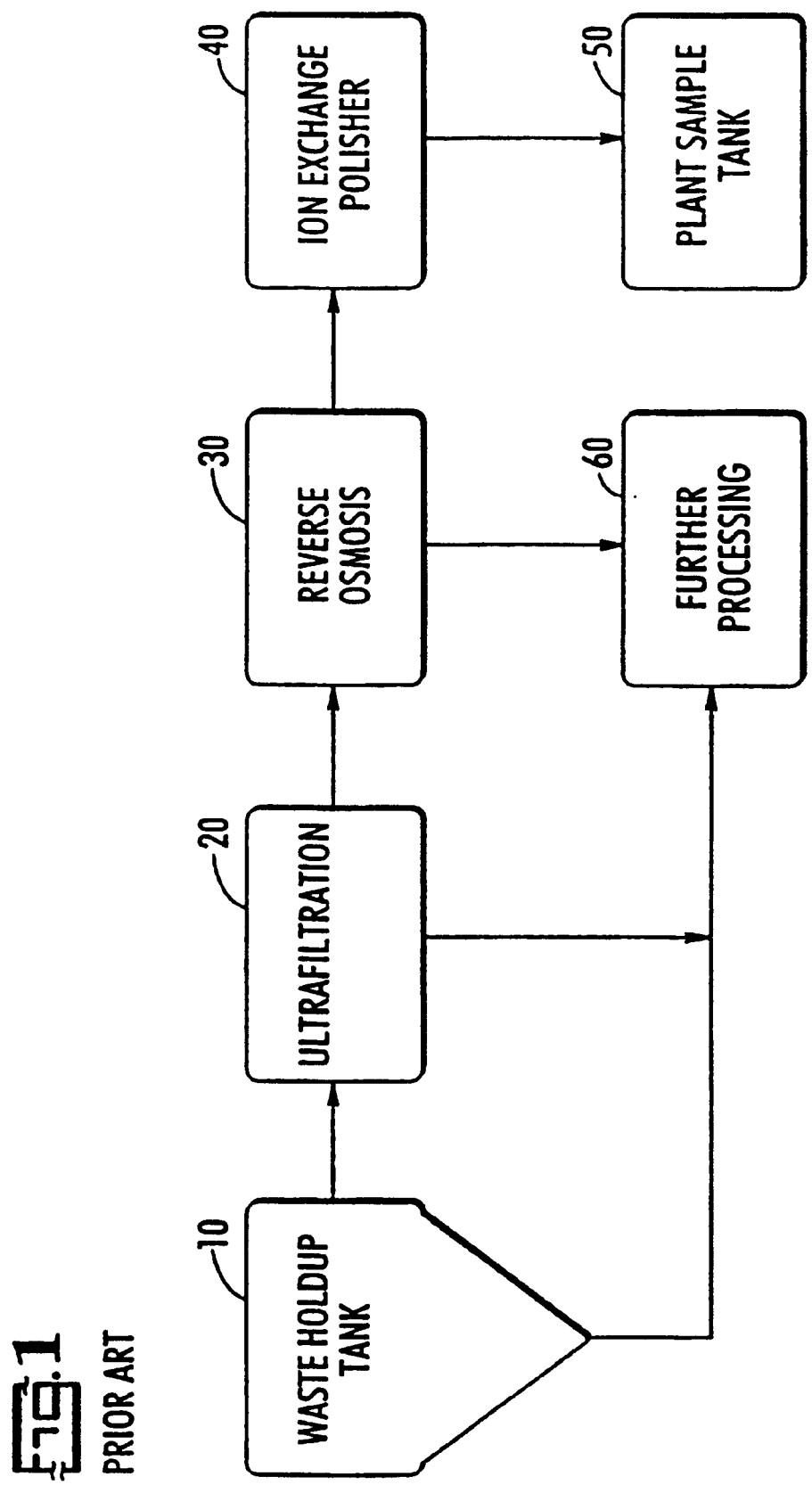
FIG. 1 is a schematic drawing of a process for treating an aqueous waste stream according to the prior art.

The present invention is a method and apparatus for processing aqueous waste streams in which the waste materials in the stream are separated from the water that carries them. In particular, the present invention improves the prior art process by introducing a step that results in less volume of waste being produced for disposal but without affecting the quality of the effluent.

As illustrated in FIG. 2, waste waters from various waste streams are collected in a waste holdup tank 110. The liquid, which will include suspended particulate and dissolved materials such as metal ions and salts, is drawn from tank 110 by a pump 130 and directed via a conduit 105 to a reject recirculation pump 107 which is connected to an ultrafiltration membrane 120. Tank 110 is not always used and may be considered an optional component in the present process.

Prior to the waste stream reaching ultrafiltration membrane 120, a sulfide or other chemical from a hopper 100 may be introduced into the waste steam through a small feed tube 102. The purpose of introducing a sulfide or other compounds is to cause the dissolved radioactive metal ions in the waste stream to be precipitated out. These metal ions can include cobalt, manganese, and iron. These metals, for example, will form metal sulfides when exposed to sulfide in solution The choice of sulfide compound may be any sulfide where the anion is biologically benign, such as calcium sulfide. The concentration of the sulfide should be selected to match the metal ion concentration mole for mole with some excess feed to account for metal ion level changes. It is important to introduce the sulfide compound or other compounds sufficiently in advance of ultrafiltration membrane 120 so that it has a chance to dissolve and to allow the precipitating ion to react with the metal ions in the waste stream. This process can be accelerated by agitating or stirring the waste. The chemical compound could also be added at any point upstream of ultrafiltration membrane 120, e.g., prior to or in holdup tank 110.

Ultrafiltration membrane 120 will reject particles of about the same size and larger than its pore size and pass water and dissolved materials.

When used herein, the word "conduit" means a pipe or hose together with fittings and valving adapted for conveying the liquid that flows through it. "Microfilters" are capable of retaining particles having a size of about 0.05 microns or larger at typical operating pressures of 0.1–3.0 bar. "Ultrafiltration" membranes trap particles down to 0.005 microns at typical operating pressures of 3–10 bar.

The effluent from ultrafiltration membrane 120 is forwarded via another conduit, conduit 125, to an optional ion exchange polisher or reverse osmosis unit 140 through which water will pass but which removes dissolved compounds. The effluent from the optional ion exchange polisher or reverse osmosis unit 140 is then in turn forwarded via conduit 145 to the plant sample tank 150 where it can be sampled for purity and then reused or released to the environment if it meets release criteria As discussed previously, ion exchange polisher or reverse osmosis unit will not be needed if precipitation of metals by the addition of sulfides or other compounds is effective.

The concentrates from ion exchange polisher/reverse osmosis unit 140 may then be forwarded for further processing 60 in accordance with the prior art method. The collected, concentrated particulate on the upstream side of ultrafiltration membrane 120, however, is directed to a microfilter 170 via a slip stream flowing from the recirculating reject stream upstream of ultrafiltration membrane 120 through conduit 155. This slipstream is maintained by a pump 160 and a controller 200 at a very flux, at the low end of flux for microfilter 170, so that the particles suspended in the waste stream can interact with each other and the filter and form a "cake" on microfilter 170. This self-generated cake permits water to flow through passages defined within it. These passages are highly irregular in cross section and direction so the flow of water through the matrix makes frequent changes in direction and speed. Because of these varying flow characteristics, the matrix will tend to trap smaller particles flowing with the water. As the matrix grows larger, it becomes even more effective. Microfilter 170 in combination with the low flux tends to collect, concentrate, and dewater the reject from ultrafiltration membrane 120. In equilibrium, it is close to 100% effective in trapping all particles in the waste stream although, on any pass, its efficiency can be lower than 100%, even much lower.

For example, if the efficiency is 50% and the sample of waste water contains 100 ppm of solids, the first pass through microfilter 170 removes 50 ppm. The second pass through the microfilter 170 removes an additional 25 ppm. The third pass removes another 12.5 ppm. In ten passes 99.9% of the particulate is removed.

At steady state conditions, $FC_F = RC_R E$, where F is the feed rate to the ultrafiltration membrane 120, R is the feed rate to microfilter 170, $C_F$ is the total suspended solids concentration in the feed to ultrafiltration membrane 120, $C_R$ is the total suspended solids concentration in the feed to microfilter 170, and E is the efficiency of microfilter 160.

The effluent from microfilter 170 is led back to conduit 165 to be returned to ultrafiltration membrane 120. The separated wastes can be processed according to the prior art method. However, they may also be disposed of directly along with microfilter 170.

Microfilter 170 can have a micron rating larger than that of the ultrafiltration membrane and can be a small slipfilter in the form of a cartridge filter that can be disposed of in a disposal site or be reused by back flushing.

The present method comprises collecting the waste stream in optional tank 110 and directing the tank contents to ultrafiltration membrane 120. The waste stream is filtered by ultrafiltration membrane 120 to divide it into a filtrate and a reject. A portion of the reject stream is directed through microfilter 170 at low flux to permit particulate to interact and be trapped as they approach microfilter 170. Microfilter 170 divides ultrafiltration membrane 120 reject into microfilter filtrate which is returned via conduit 165 running to ultrafiltration membrane 120, and microfilter 170 loaded with solids. Microfilter 170 and solids are prepared directly for disposal without the need for solidification or other treatment Ultrafiltration membrane 120 effluent is processed by reverse osmosis filtration and/or ion exchange polishing, unless it meets the release criteria for the particular facility generating the waste stream.

Ultrafiltration membrane 120 can be back flushed with water, ozone and water, or an air/water mixture to remove particulate. Injection of ozone and water also provides cleaning of the membrane when it is fouled by organics. A tank 180 of back flush feed water discharges through a conduit 175 to the downstream side of ultrafiltration membrane 120 during the back flush cycle. Tank 180 can be filled with ultrafiltration membrane filtrate, thereby eliminating the need for the plant to supply demineralized water for back flushing. The backflush water effluent from the ultrafiltration membrane is collected in a back flush collection tank 190. The contents of tank 190 are then reprocessed to remove suspended solids by feeding the tank contects to the upstream side of ultrafiltration membrane 120 along with the effluent from microfilter 170.

It will be apparent to those skilled in the art of waste water processing that many modifications and substitutions may be made to the foregoing detailed description without departing from the spirit and scope of the present invention, which is defined by the appended claims.

What is claimed is:

1. A waste water treatment apparatus for use in line with a source of waste water, said system comprising:

a first filter having an upstream side and an opposing downstream side and a pore size, said upstream side being in fluid communication with said source of waste water and adapted so that said waste water passes through said first filter leaving a first filter reject flow on said upstream side, said first filter reject flow containing particulate;

slipstream means for creating and controlling a slipstream flow from said reject flow on said upstream side of said first filter; and a second filter having a micron rating larger than said pore size of said first filter, said second filter primarily providing mechanical filtration, said second filter having an upstream side and an opposing downstream side, said second filter being connected to a conduit so that, when said slipstream means creates and controls said slipstream flow, said second filter receives on said upstream side thereof a controlled flow containing said first filter reject flow particulate, said second filter collecting a second filter reject on said upstream side thereof, said second filter having second filter filtrate flow on said downstream side thereof, said second filter filtrate flow being recycled to said upstream side of said first filter, wherein waste water flow from said source of waste water is directed first to said first filter prior to a portion of said waste water flow being directed to said second filter by said slipstream means, whereby, due to repeated recycling of said slipstream between said first filter and said second filter, about 100% of said waste water passes through said first filter and about 100% of said particulate is collected by said second filter as said second filter reject without the need to drain said slipstream containing said first filter reject.

2. The apparatus as recited in claim 1, wherein said first filter is an ultrafiltration membrane.

3. The apparatus as recited in claim 1, wherein said second filter is a microfilter.

4. The apparatus as recited in claim 1, wherein said downstream side of said first filter is in fluid communication with a means for removing dissolved contaminants.

5. The apparatus as recited in claim 1, wherein said downstream side of said first filter is in fluid communication with a reverse osmosis unit.

6. The apparatus as recited in claim 1, wherein said slipstream flow has a flux through said second filter that is maintained low enough so that said slipstream can just pass through said second filter.

7. The apparatus as recited in claim 1, further comprising means for precipitating metals in said waste water, said precipitating means located upstream of said first filter.

8. The apparatus as recited in claim 1, further comprising means for back flushing said first filter, said back flushing means located downstream of said first filter.

9. The apparatus as recited in claim 8, wherein said back flushing means further comprises a tank for holding a back flushing liquid, said back flushing liquid used for back flushing said first filter.

10. The apparatus as recited in claim 9, wherein said back flushing liquid is said first filter filtrate.

11. The apparatus as recited in claim 10, wherein said back flushing means removes particulate from said upstream side of said first filter, said particulate being directed to said slipstream and received by said second filter.

12. The apparatus as recited in claim 8, wherein said back flushing means uses said recycled slipstream to provide a high velocity flow across said upstream side of said first filter in order to increase back flushing flux recovery efficiency.

13. The apparatus as recited in claim 1, wherein said apparatus produces an effluent that does not require additional processing, said effluent being downstream of said downstream side of said first filter.

14. The apparatus as recited in claim 1, wherein said apparatus does not produce a liquid waste stream that requires additional processing.

15. The apparatus as recited in claim 1, wherein said second filter is a disposable cartridge-type filter carried in a housing.

16. The apparatus as recited in claim 1, wherein a flux of said slipstream flow through said second filter is maintained low enough so that a cake of particles is formed on said upstream side of said second filter.

17. The apparatus as recited in claim 16, wherein said slipstream flux through said second filter is maintained low enough so that said slipstream can just pass through said second filter without affecting said cake of particles.

18. The apparatus as recited in claim 1, wherein a portion of a recirculating reject stream bypasses sad second filter and is recycled to said upstream side of said first filter, said recirculating reject stream having a high enough velocity to carry said first filter reject away from said upstream side of said first filter, wherein a portion of said recirculating reject stream that does not bypass said second filter becomes said slipstream flow.

19. The apparatus as recited in claim 1, wherein said about 100% of said particulate is collected by said second filter without said second filter having a high per pass particulate removal efficiency.

20. The apparatus as recited in claim 1, wherein said waste water from said source of waste water contains radioactive materials.

21. The apparatus as recited in claim 1, wherein said water from said source of waste water contains hazardous materials.

22. The apparatus as recited in claim 1, wherein said waste water from said source of waste water contains radioactive materials and hazardous materials.

23. The apparatus as recited in claim 1, wherein said second filter reject can be further processed to recover useful materials contained within said second filter reject.

24. The apparatus as recited in claim 23, wherein said useful materials are precious metals.

25. The apparatus as recited in claim 23, wherein said useful materials are biologically based materials, said biologically based materials being recovered without the need for thermal processing.

26. The apparatus as recited in claim 1, wherein said particulate is collected without the need for thermal processing.

27. The apparatus as recited in claim 1, wherein said second filter reject can be disposed without the need for thermal processing.

28. The apparatus as recited in claim 1, wherein said first filter primarily provides mechanical filtration.

29. An apparatus for use with a waste treatment system having a source of waste water carrying particulate and an ultrafiltration membrane downstream of and in fluid communication with said waste water source, said ultrafiltration membrane having an upstream side and a downstream side, said apparatus comprising:

means for establishing a recirculating reject stream on said upstream side of said ultrafiltration membrane so that particles rejected by said ultrafiltration membrane can be carried away from said upstream side of said ultrafiltration membrane;

means for establishing a slipstream from said recirculating reject stream so that particles rejected by said ultrafiltration membrane and carried by said recirculating reject stream can be removed from said recirculating reject stream;

a microfilter in fluid communication with said slipstream establishing means and receiving said slipstream to remove said particles rejected by said ultrafiltration membrane and carried by said recirculating reject stream, wherein waste water flow from said source of waste water is directed first to said ultrafiltration membrane prior to a portion of said waste water flow being directed to said recirculating reject stream and to said microfilter by said slipstream establishing means; and means for controlling the flux of said slipstream through said microfilter.

30. The apparatus as recited in claim 29, further comprising means for recycling filtrate from said microfilter to said upstream side of said ultrafiltration membrane.

31. The apparatus as recited in claim 29, further comprising means for back flushing said ultrafiltration membrane, said back flushing means being in fluid communication with said downstream side of said ultrafiltration membrane.

32. The apparatus as recited in claim 31, wherein said back flushing means further comprise a tank for holding a back flushing liquid, said back flushing liquid used for back flushing said ultrafiltration membrane.

33. The apparatus as recited in claim 31, wherein said back flushing means uses said recirculating reject stream to provide a high velocity flow across said upstream side of said ultrafiltration membrane in order to increase a back flushing flux recovery efficiency.

34. The apparatus as recited in claim 29, further comprising means for precipitating dissolved metals in said waste water, said precipitating means being located on said upstream side of said ultrafiltration membrane.

35. A method for processing waste water, said method comprising the steps of:

directing a flow of wastewater toward a first filter having a first pore size so that said first filter divides said waste water into a filtrate on a downstream side of said first filter and a first filter reject flow on an upstream side of said first filter, said first filter reject flow containing suspended solids;

allowing a slipstream to be formed on said upstream side of said first filter to carry a portion of said first filter reject flow;

directing said slipstream toward a second filter having a micron rating larger than said first pore size of said first filter wherein said flow of waste water is directed to said first filter prior to a portion of said flow of waste water being directed to said second filter by said slipstream; and recycling said slipstream between said first filter and said second filter repeatedly so that about 100% of said waste water passes through said first filter and about 100% of said particulate is collected by said second filter as said second filter reject without the need to drain said slipstream containing said first filter reject.

36. The method as recited in claim 35, further comprising the step of maintaining the flux of said slipstream across said second filter low enough to permit removal of at least a portion of said first filter reject in said slipstream with each pass.

37. The method as recited in claim 36, further comprising the step of forming a cake of particles on an upstream side of said second filter.

38. The method as recited in claim 37, further comprising the step of dewatering said cake of particles.

39. The method as recited in claim 35, wherein said first filter is an ultrafiltration membrane.

40. The method as recited in claim 35, wherein said second filter is a microfilter.

41. The method as recited in claim 35, further comprising the step of disposing of said second filter reject without requiring additional processing of said second filter reject.

42. The method as recited in claim 35, further comprising the step of injecting sulfides or other chemicals into said waste stream on said upstream side of said first filter.

43. The method as recited in claim 35, further comprising the step of back flushing said first filter with a mixture of ozone and water.

44. The method as recited in claim 35, further comprising the step of recovering useful materials contained within said second filter reject.

45. The method as recited in claim 44, wherein said useful materials are precious metals.

46. The method as recited in claim 44, wherein said useful materials are biologically based materials, said biologically based materials being recovered without the need for thermal processing.

\* \* \* \* \*